Feb. 10, 1953.  A. SOKOLOWSKI  2,627,689
ICE FISHING DEVICE
Filed May 2, 1950
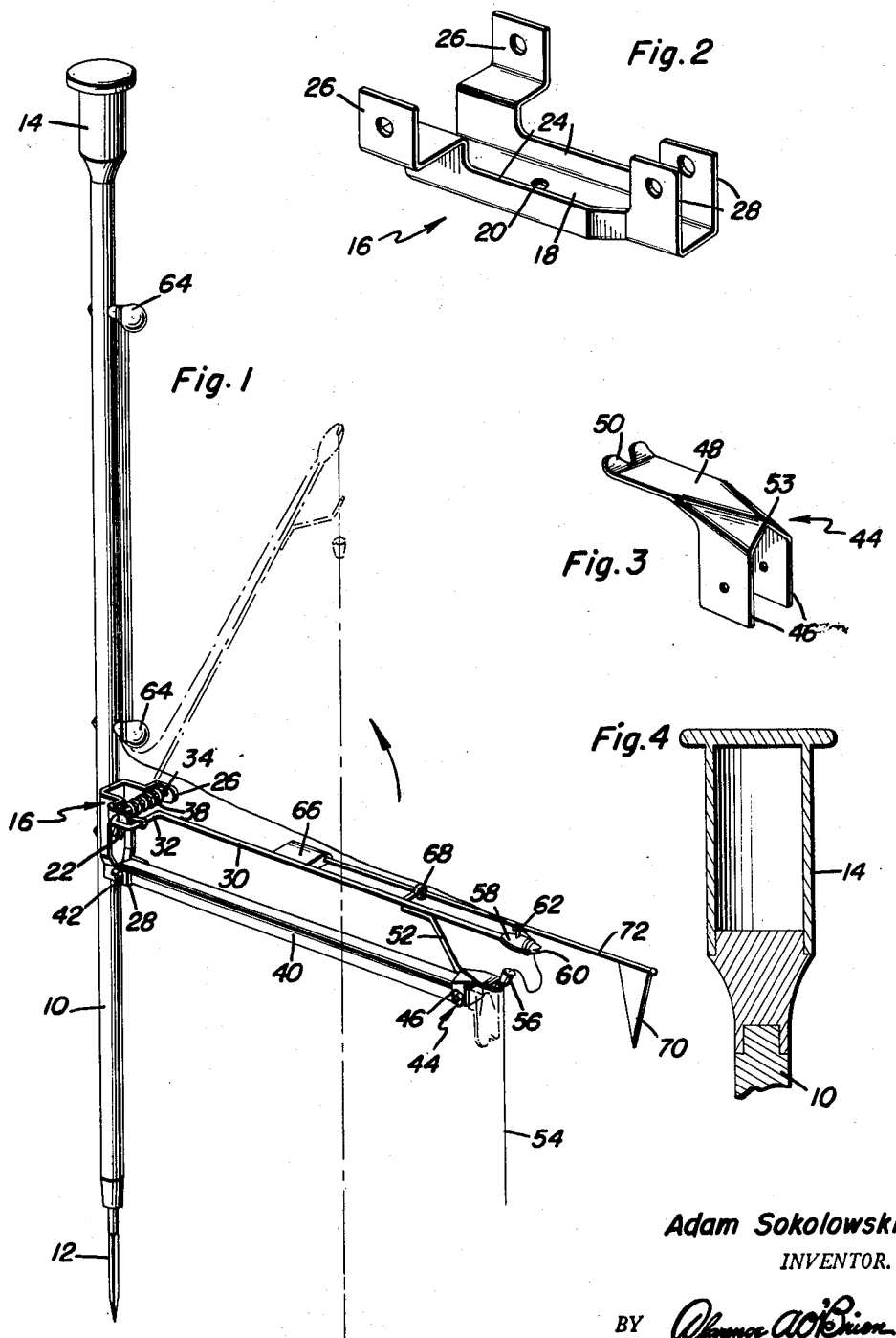
Adam Sokolowski
INVENTOR.

Patented Feb. 10, 1953

2,627,689

UNITED STATES PATENT OFFICE 2,627,689

ICE FISHING DEVICE

Adam Sokolowski, Conrath, Wis.

Application May 2, 1950, Serial No. 159,521

2 Claims. (Cl. 43—16)

This invention relates generally to fishing equipment and more particularly to the device for so-called automatic fishing, the device being particularly devised for use in fishing through apertures in an ice covered body of water.

An important object of this invention is to provide a fishing device wherein a main supporting member or standard is easily securable in upright position in the ice, while an arm carried by the standard and a pole arranged parallel thereto extends over the aperture in the ice, the pole being spring biased to swing upwardly from a variable position determined by the position of the arm which is adjustable pivotally on the standard, this adjustability making the device considerably more versatile and efficient for use in fishing different types of fish.

Another object of this invention is to provide flag means to signal the fact that a fish has struck the bait on the end of the line and has disturbed the trigger or trip latch means used to secure the pole to the arm when the pole is in depressed position.

Another object of this invention is to provide means for measuring the length of line being used, indirectly, this means being associated with means for retaining the upper end of the line on the standard.

Still another object of this invention is to provide improved means for connecting the fish line on the end of the automatically operated pole.

Yet another object of this invention is to provide means for controlling the set of the trigger in the trip latch used to connect the said arm with the pole.

And a last object to be mentioned specifically is to provide a fishing device which is relatively inexpensive and practical to manufacture which is simple, safe and convenient to use under varying conditions, and which will give generally efficient and durable service.

With these objects definitely in view, this invention resides in certain novel features of construction, combination and arrangement of elements and portions that will be hereinafter described in detail in the specification, particularly pointed out in the appended claims, and illustrated in the accompanying drawings which form a material part of this application, and in which:

Figure 1 is a view of the assembled device, in perspective, the trigger and the pole being shown in a second position in dash line;

Figure 2 is a perspective view of the bracket;

Figure 3 is a perspective view of the trigger; and

Figure 4 is a vertical sectional view taken on a center line through the upper end portion of the standard.

Similar characters of reference designate similar or identical elements and portions throughout the specification and throughout the different views in the drawings.

Referring now to the drawings in detail, this invention includes the standard 10 which will ordinarily be maintained in an upright position, the lower end of the standard being provided with a sharpened spike 12, square in cross section while the upper end of the standard is provided with an enlarged knob handle structure indicated at 14. The provision of the handle and spike upon the standard allows the rigid securement of the standard in the ice at the side of a hole wherethrough the fisherman intends to fish.

A bracket generally indicated at 16 comprises a back plate 18 having an aperture 20 wherethrough an attaching bolt 22 is inserted in order that the bracket may be secured to the standard 10. The bracket 16 also includes a pair of reinforcing lateral flanges 24 which are integral with offset apertured lugs 26 at the upper end of the bracket, while a somewhat similar pair of lugs 28 is provided at the other end of the bracket.

A pole 30 is bent to provide a laterally extending portion 32 and a returned portion 34 which is used as an attachment member pivotally mounted in the proposed apertured lugs 26 of the bracket 16. A coiled spring 38 is arranged coaxially on the said returned portion 34 and between the apertured lugs 26, the ends of the springs being connected to the bracket and to the portion 32 so as to bias the pole 30 upwardly about the pivot provided by the portion 34.

A rigid arm 40 is secured by a bolt and wing nut 42 between the apertured lugs 28, this construction allowing the pivotal adjustment of the arm 40.

A trigger 44 is mounted by means of a similar bolt and wing nut 46 upon the outer end of the arm 40, this trigger including downturned opposing ears 46 which are apertured to receive and coact with the said bolt and wing nut 46. The trigger also includes a plate portion 48 terminating in an upwardly turned portion having a notch 50 therein. The pole 30 carries a finger 52 which is downwardly and outwardly offset to engage a portion 53 of the trigger, remote from the notch 50.

A fish line 54 has a member 56 longitudinally and frictionally slidably mounted thereon, this member being constructed of cork or any other suitable material and being of a size adapted to engage the edges of the notch 50 when the line 54 is received in this notch 50. The pole 30 has an enlargement 58 on the outer end thereof, this enlargement having a transverse slot 60 to receive a portion of the line 54, and this enlargement also carries a hook 62 upon which the line may be temporarily fastened at a point intermediate the ends of the line.

A pair of knobs 64 are rigidly secured in vertically spaced relation upon the standard 10, it being preferred that these knobs be spaced apart exactly one foot or some other similar definite linear unit, and one end of the line 54 is secured to one of these knobs, whereby the fisherman is able to estimate reasonably accurately the depth of the line extending below the arm 40, since the total length of the line can easily be known and the number of loops remaining on the knobs 64 indicate the major portion of the unused part of the line.

The socket member 66 is integrally or otherwise secured to an intermediate portion on the pole 30 and an eye member 68 is secured to a portion of the pole between the socket member 66 and the outer end of the pole. The socket member 66 and the eye member 68 supports a flag 70, a shaft portion 72 of the flag being inserted through the eye member and terminally inserted in the socket 66. This flag 70 is easily removed when it is not desired to use the same.

The operation of this invention will be clearly understood from a consideration of the foregoing description of the mechanical details thereof, taken in connection with the drawings and with the above recited objects. It will be clear that all the objects recited are amply achieved by this invention. In recapitulation, it will be obvious that when a fish strikes a hook on the lower end of the line 54, the member 56 will be pulled downwardly to disengage the trigger 44, the trigger falling by gravity and/or by the force of the pull on the line and releasing the finger 52, so that the pole 30 swings upwardly under the influence of the coiled spring 38, into a position such as that indicated in dash line in Figure 1. This action will set the hook on the line 54 in the fish's mouth, so that the fish will not be lost even though the fisherman may be at a slight distance and a certain time will be required before he can commence landing the fish. Of course, the flag 70 is an aid in signalling the fisherman that a fish has struck and has dislodged the line from the trigger. Further description would appear unnecessary.

Having described the invention, what is claimed as new is:

1. In a fishing device, a portable upright standard, a bracket on the standard, a pole pivoted on said bracket, a spring connected to said pole to bias the same to pivot upwardly, an arm horizontally mounted on said bracket and extending parallel to and below said pole and slightly shorter than said pole, a trip latch connecting said pole and arm when the pole is depressed against the action of said spring, and a fish line connected to an outer end portion of said pole and operatively connected with said trip latch, said trip latch including a finger carried by said pole and a trigger on said arm adjustably engaging said finger in one position to vary the pivotal action of the trigger, said line being operatively connected with said trigger.

2. A device according to claim 1 wherein said arm is pivotally adjustable relative to the standard whereby the amount of throw of the pole can be varied.

ADAM SOKOLOWSKI.

REFERENCES CITED

The following references are of record in the file of this patent:

UNITED STATES PATENTS

| Number | Name | Date |
|---|---|---|
| 75,075 | Talbot | Mar. 3, 1868 |
| 834,414 | Schmidt | Oct. 30, 1906 |
| 1,516,484 | Meszaros | Nov. 18, 1924 |
| 1,957,853 | Sibley | May 8, 1934 |
| 1,996,704 | Hawkinson | Apr. 2, 1935 |
| 2,479,055 | Baur | Aug. 16, 1949 |

FOREIGN PATENTS

| Number | Country | Date |
|---|---|---|
| 66,858 | Norway | Oct. 4, 1943 |
| 62,781 | Germany | June 10, 1892 |